United States Patent Office 3,257,332
Patented June 21, 1966

3,257,332
POLYMERIZATION OF ETHYLENE
Karl Ziegler, Kaiser-Wilhelm-Platz 1, Mulheim an der Ruhr, and Heinz Breil, Erhard Holzkamp, and Heinz Martin, Mulheim an der Ruhr, Germany; said Breil, said Holzkamp, and said Martin assignors to said Ziegler
No Drawing. Filed Nov. 15, 1954, Ser. No. 469,059
Claims priority, application Germany, Nov. 17, 1953, Z 3,799; Dec. 15, 1953, Z 3,862; Dec. 23, 1953, Z 3,882
14 Claims. (Cl. 252—429)

This invention relates to new and useful improvements in the polymerization of ethylene for the production of high molecular polyethylenes.

The polymerization of ethylene for the production of polymers ranging from gaseous through solid polymers is well known. When producing solid polymers from gaseous ethylene, high pressures of, for example, 1000 atmospheres and more were generally required and oxygen or peroxides were generally used as the polymerization catalyst. The yield obtained by these conventional methods was generally low with, for example, about 15–20% of the ethylene being converted in a single operation into the polyethylene.

The highest polyethylene polymer which could be effectively obtained by the prior known methods had a molecular weight of about 50,000.

It has also been proposed to polymerize ethylenes using aluminum trialkyls as the polymerization catalyst. This polymerization reaction, however, is generally intended for producing low molecular polymers not ranging substantially above the liquid range. It has further been proposed to modify the polymerization using the aluminum trialkyl catalysts by the addition of auxiliary catalysts such as nickel or cobalt. In this connection, there are obtained low molecular polymerization products, such as a butene-1.

Higher molecular polyethylenes may also be obtained from ethylene using an aluminum trialkyl catalyst by selecting a suitable quantity ratio of the aluminum trialkyl to the ethylene. It is, however, extremely difficult to obtain polyethylene of a molecular weight higher than a few thousand and it is necessary to use an extremely small quantity of the aluminum trialkyl as, for example, aluminum triethyl for the production of higher molecular products. With the use of such small quantities of the aluminum trialkyl, however, the reaction becomes extremely sensitive to traces of impurity in the ethylene and proceeds very slowly, since the quantity of catalyst in the total reaction mixture is very small.

One object of this invention is a new process for polymerizing ethylene into high molecular polyethylenes which may be used as plastics.

A further object of this invention is a new process for the polymerization of ethylene into high molecular polyethylenes with a higher yield than heretofore obtainable.

A still further object of the invention is the polymerization of ethylene into polyethylenes having molecular weights higher than those heretofore obtainable.

A still further object of the invention is a novel high molecular polyethylene.

A still further object of the invention is a novel highly active catalyst for the polymerization of ethylene.

These and still further objects will become apparent from the following description:

In accordance with the invention gaseous ethylene is polymerized into high molecular polyethylenes by contact with a catalyst formed by mixing an aluminum trialkyl compound with a compound of a metal of Group IV–B, V–B, or VI–B of the Periodic System of Elements.

The term "high molecular" as used herein is intended to designate molecular weights of more than 2,000, and preferably more than 10,000. The molecular weights referred to are the molecular weights calculated in the conventional manner on the basis of the viscosity of the polyethylene as described in the Journal für Praktische Chemie, 2nd series, vol. 158 (1941), and page 136 of the J. of A.S. 73, page 1901 (1951). On the basis of molecular weights calculated in this manner, polyethylenes having molecular weights of 300,000 up to 3,000,000 and more may be obtained in accordance with the invention.

The aluminum trialkyl compounds which may be used in forming the catalysts in accordance with the invention may be any conventional or known aluminum trialkyl as, for example, aluminum trimethyl, aluminum triethyl, aluminum tripropyl, aluminum triisobutyl, or higher aluminum trialkyls having, for example, an average composition of aluminum trioctyl or tridodecyl without limitation of the number of carbon atoms, or their mixtures. The quantity of aluminum trialkyl used is referred to in the claims as "an effective quantity." This term designates a quantity larger than a trace, but without limitation to any specific values mentioned hereinafter, which is sufficient to exert an influence on the other components in forming the polymerization catalyst.

The compounds of the metals which are mixed with the aluminum trialkyl to form the catalyst may be any compound of a metal on the left hand side of the IV to VI Groups of the Periodic System, including thorium and uranium. In certain of the newer Periodic Charts of the Elements, these metals on the left hand side of the IV to VI Groups of the Periodic System are designated as Groups IV–B, V–B, and VI–B respectively. When reference is made herein and in the claims to metals of Groups IV–B, V–B and VI–B of the Periodic System, there is intended any member of these groups, including thorium and uranium, as for example, titanium, zirconium, hafnium, thorium, uranium, vanadium, niobium (columbium), tantalum, chromium, molybdenum and tungsten. Any compound of these metals such as the halogenides, for example chlorides or bromides, for example, complex fluorides, freshly precipitated oxides or hydroxides or organic compounds, for example alcoholates, acetates, benzoates or acetyl acetonates and similar compounds may be used. Salts of titanium, zirconium, uranium, thorium and chromium have been found to be preferable.

A particular active catalyst in accordance with the invention may be obtained, for example, by mixing a titanium or zirconium compound, such as a tetrachloride, an oxychloride or acetyl acetonates with the aluminum trialkyl.

The exact nature of the catalyst produced by the mixing of the metal compound of Group IV–B to VI–B and the aluminum trialkyl is not known, It is believed that the metal compound is converted to a lower valency form. Thus, for example, upon bringing together the tetravalent zirconium compound and the aluminum trialkyl, there is formed a compound of monovalent, bivalent or trivalent zirconium. The fact that the quadrivalent zirconium salt undergoes a conversion may be clearly noted from the fact that the initially colorless salt dissolves in the aluminum trialkyl, becoming darker in color and generating heat. While the special polymerizing action of the catalyst in accordance with the invention may come from the combination with the aluminum alkyl, probably the low valence Group IV–B, V–B, or VI–B metal compound has a high polymerization effect by itself, since the action of the catalyst on the ethylene starts at a lower temperature and takes place more rapidly than the normal reaction of aluminum trialkyl with ethylene.

In forming the catalyst with the admixture of the aluminum alkyl to the Group IV–B, V–B, or VI–B metal compound, it has been found preferable to use molar quantities of the aluminum alkyl of two to three times the valence of the Group IV–B, V–B or VI–B metal. Thus, a number of molecules of the aluminum alkyl equal to two to three times the valence of the metal of the Group IV–B, V–B, or VI–B should be present per molecule of the compound of that metal. In, however, the special case where the Group IV–B to VI–B metal compound consists of an acetyl acetonate, the use of twice the quantity of aluminum trialkyl has proven preferable.

When, for example, using a titanium salt other than acetyl acetonate, the ratio of 8 to 12 moles aluminum trialkyl to one mole of the tetravalent titanium salt has proven particularly advantageous. When the aluminum trialkyl acts on the tetravalent titanium salt, a reduction takes place which, however, does not reduce the titanium to metallic titanium. If the aluminum trialkyl reacts at first only with one alkyl group such as an ethyl group as corresponds in general to the reactivity of the organic aluminum compounds, not more than three molecules of aluminum trialkyl will presumably be consumed in the reduction of the tetravalent titanium salt. An excess of alkyl component beyond that serving for preparing the catalytically effective material is normally present when using the above referred to multiple mol amounts. This excess of aluminum trialkyl is of value to counteract the oxidizing action of impurities frequently present in the ethylene as, for example, moisture or oxygen which oxidize the air sensitive catalysts and thus impair their activity. The excess of the aluminum trialkyl prevents this oxidation or reduces the already oxidized catalyst to eliminate impurities possibly present in the ethylene.

The minimum quantities of the catalysts in relation to the ethylene employed may vary within very wide limits and are dependent upon the purity of the ethylene. When using very pure ethylene 0.1 part of catalyst to 1,000 parts of ethylene will already be sufficient. It is evident that larger quantities can be used even in the case of pure ethylene. However, it is desirable to avoid using unnecessarily large quantities of catalyst so as not to make the working up process more difficult than is necessary. Taking very impure ethylene good results can nevertheless be obtained with quantities of catalysts amounting to only a few percent. If solvents are used for the polymerization, the same applies in connection with the purity of the solvents. The quantities of catalysts employed influence the molecular weight of the polyethylene produced so that the degree of polymerization will be higher the smaller the quantity of catalysts employed.

The polymerization in accordance with the invention is effected by merely contacting the gaseous ethylene with the catalyst formed in the manner described above. While it is preferable to effect the contacting at comparatively low pressures of about 10–100 atmospheres, the contacting pressure is not critical and a smooth polymerization may be effected at atmospheric or subatmospheric pressures. On the other hand, the action of the new catalyst on the ethylene remains fundamentally unchanged, even if the pressure is increased to any desired obtainable value.

The temperature of the contacting is not critical and the same may be effected at room temperature or below. It is advantageous to operate at somewhat elevated temperatures and particularly above about 50° C. Thus, as contrasted to prior art processes, the ethylene in accordance with the invention may be very rapidly converted into high molecular polyethylene even at low pressures of less than 100 atmospheres and temperatures of less than 100° C. Working at temperatures above 250° C. is not advisable because at this temperature the catalysts decompose to a considerable extent.

Further, in accordance with the invention, instead of pure ethylene, ethylene-containing gas mixtures may be directly used for the polymerization, for example, gases which are generated during the cracking of saturated hydrocarbons, such as ethane or propane, or from mineral oil or its fractions, or generated during similarly conducted Fischer-Tropsch synthesis, and possibly freed from other olefins.

The activity of the catalyst and the degree of polymerization of the final substances obtained are dependent upon the metal compounds selected, the manner of its preparation and the ratio of the quantity of the metal compound to the quantity of the aluminum trialkyl.

Thus, it has been found that, when using sufficient quantities of the Group IV–B to VI–B metal-containing components of the catalyst, titanium-containing catalysts are more active than zirconium-containing catalysts. The activity of the catalyst can be further substantially increased by using for the preparation, instead of a relatively low molecular aluminum trialkyl, an aluminum trialkyl having larger alkyl radicals as can be advantageously obtained, for example, from aluminum triethyl by combination with ethylene. In this connection, and in certain other cases, it may be advisable to operate in the presence of solvents. Suitable solvents are: aliphatic and hydroaromatic hydrocarbons, such as pentane, hexane, cyclohexane, tetrahydronaphthalene, decahydro-naphthalene; higher paraffins, also in mixtures; paraffins liquid at the reaction temperature, aromatic hydrocarbons, such as benzol, xylol; halogenated aromatic hydrocarbons, such as o-dichloro-benzol, chlorinated naphthalene; ethers such as dibutyl-ether, dioxane, tetrahydrofurane. These solvents are used in such quantities that it is still possible to stir the reaction mixture even when it is nearing the end of the reaction. Generally this stirring operation is also possible when the reaction mixture contains 10 to 40% polyethylene at the end of the reaction. Maximum limits only exist as regards the economy of the process.

If, for example, titanium tetrachloride is introduced, droy by drop, into a hexane solution of aluminum triethyl in a molar ratio of 1:8, the solution assumes a dark color and a difficultly soluble black precipitate deposit, which contains aluminum and titanium. This difficulty soluble compound, the exact structure of which is not known, is believed to be the true polymerization exciter. With suspension of this precipitate in a solvent such as hexane, ethylene can be readily polymerized, even at normal pressure. The starting hexane also assumes a deep color and contains the same compound apparently in a colloidally dispersed state. The amount of precipitate which remains colloidally suspended and the amount which separates out vary with the manner in which the precipitate is formed. The colloidally dispersed form is, of course, more reactive, and can be more conveniently dosaged out than the difficultly soluble precipitate.

The difficulties when working with the precipitate itself can be readily overcome if, instead of using a solution of aluminum triethyl in hexane, there is used a solution of a higher aluminum trialkyl which, for example, has approximately the average composition of an aluminum trioctyl. In this case, there is obtained a completely homogenous dark solution of the polymerization catalyst.

Since, in accordance with the invention, the quantity of the aluminum trialkyl used as compared with the ethylene has no direct influence on the molecular weight of the polyethylene obtained, much larger quantities of the aluminum trialkyl can be used which, as mentioned above, is beneficial for effecting the elimination of any possible impurities in the ethylene.

The polyethylenes obtained in accordance with the invention, as has been set forth above, have an extremely high molecular weight. These polyethylenes are believed to be completely novel and different from the solid polyethylene polymers previously obtained. The new polyethylenes in accordance with the invention have a softening point or melting point, which will be generally referred to herein as the softening point, of more than 130° C. and are completely insoluble in all solvents at room temperature.

The polyethylenes produced in accordance with the invention, having a molecular weight up to about 100,000 will only partially dissolve in solvents at a temperature of above 70° C., while those having a molecular weight above 100,000 will only partially dissolve in solvents at temperatures above 100° C. The temperature resistance of the new polyethylenes is greater than that of the known conventional polyethylenes. Upon heating the new products to temperatures above 250° C., they retain their white color, while the color of the known products changes to gray between 200 and 250° C. The resistance of the new polyethylenes to oxidation by atmospheric oxygen is also much greater.

The new polyethylenes in accoradnce with the invention have a high crystal content which is unusual for high molecular hydrocarbons. The degree of crystallization, as shown by X-ray diagrams, generally amounts to 80% and in many cases even higher. Naturally also lower values occur. The crystallinity remains unchanged to a temperature of 100° C. and disappears only near the softening point.

The new polyethylenes are almost completely linear in molecular structure and have practically no branch chains. These polyethylenes contain at most three branched methyl groups for every 100 carbon atoms in the linear chain. In general, the percentage of the methyl groups is even substantially less, being at most about 0.03% and possibly even less than 0.01%. Ultraspectrographs of the new products in accordance with the invention do not show the characteristic methyl band of the prior known polyethylenes.

The tear strength of the new polyethylenes in accordance with the invention is a minimum of 100 kilograms per square centimeter, and frequently more than 200 kilograms per square centimeter. The tensile strength in unstretched condition is more than 200 kilograms per square centimeter and in elongation-oriented sheets, up to 3,000 kilograms per square centimeter.

The products may be worked directly, for example, between heated plates, into clear, transparent, elastic and flexible plates or sheets. The polyethylenes are also well suited for working in extrusion presses or for injection molding. In molten state they can be spun into thread by the methods usually employed for spinning superpolyamide threads. They may be cold drawn and may be drawn in this manner into ribbons, wires, or filaments of high elasticity and strength such as have never been obtained with prior known polyethylenes. Already in the working, the new polyethylenes show a remarkable tendency toward fiber formation. The threads produced from the new polyethylenes can be used as threads for industrial purposes.

The following examples are given by way of illustration and not limitation:

*Example 1*

Twenty cc. of aluminum tripropyl are carefully mixed with 0.2 gram titanium tetrachloride, which results in a very vigorous generation of heat. The solution becomes an opaque black, and is introduced under nitrogen into an autoclave of a volume of 500 cc. 60–70 grams of ethylene are forced in the autoclave which is then heated while shaking to 100° C. Within the course of 15 hours, the pressure drops to about 20 atm. The reaction mixture is allowed to cool and the excess ethylene is blown off. The content of the autoclave is in the form of a paste-like mass which consists of a mixture of high-molecular ethylene and low-molecular liquid and solid, soluble products. It is stirred with methyl alcohol, extracted with methyl-alcoholic hydrochloric acid and thereupon with acetone. There remains 30 grams of an insoluble residue of high melting point which consists of a snow-white, finely granular, powdered mass of polyethylene. The powdery mass is pressed between metal plates heated to 150° C. and thereafter rapidly cooled, thus, forming a film which is extremely elastic and can be torn only with the application of a very great force.

*Example 2*

Two grams of titanium tetrachloride were added, drop by drop, with the exclusion of air, into 40 cc. of aluminum triethyl. A black precipitate formed with a vigorous production of heat. 200 cc. of hexane were added to the mixture, and a part of the dark substance which had formed precipitated and another portion remained in solution with a dark color in the hexane, presumably in colloidal solution. The hexane fraction was transferred into a 500 cc. autoclave which was filled with nitrogen and ethylene was introduced up to a pressure of 60 atmospheres. Upon shaking, the temperature increased spontaneously to 60° C. and the pressure dropped 25 atmospheres. The introduction of ethylene under pressure was repeated but another strong rise in temperature was not noted. Nevertheless, the ethylene pressure receded again though more slowly. Ethylene was introduced under pressure a total of five times, a total of 88 grams of ethylene being introduced in this manner into the autoclave. After a total of 65 hours, it was possible to blow only 4 grams of ethylene out of the autoclave. The content of the autoclave consisted of a solid mass which could be crushed only with a difficulty and which had completely absorbed the solvent used. This mass was broken out of the autoclave in a suitable manner, introduced into methyl alcohol and thereupon heated with methyl-alcoholic hydrochloric acid. After filtration, washing with methyl alcohol and drying, 80 grams of a white difficulty soluble powder were obtained which was pressed between heated metal plates at 160–170° to form clear transparent sheets having extremely good mechanical properties. A narrow strip cut out of such a sheet was stretched in the cold to about 3–4 times its length, in which connection the characteristic phenomena known from the stretching of polyamide tapes was observed. The tear strength of the stretched tapes was as high as 30 kg./mm.$^2$.

*Example 3*

Example 2 is repeated using as the polymerization excitor the black precipitate which settled upon dilution with hexane which was completely freed from dissolved portions of aluminum triethyl by repeated formation of a suspension with hexane, settling and pouring off of the solvent all with the exclusion of air. In all other respects the procedure and results are substantially the same as in Example 2.

*Example 4*

Five hundred cc. of liquid paraffin are deairated by the introduction of nitrogen and heating to 100° C. After cooling there are added 58 grams of an aluminum trialkyl of the average composition of aluminum tridodecyl, whereupon 2.6 grams titanium tetrachloride are admixed while stirring under nitrogen. The mixture becomes an opaque black. However, no solid precipitate settles out. Thereupon ethylene is introduced while stirring at room temperature. The temperature rises during the course of ½ hour by itself from 23 to 43° C. and the ethylene is vigorously absorbed at a rate of about 10 grams per hour. Soon after the beginning of the experiment it can be noted that difficultly soluble substance separates out of the mixture. After about 3–4 hours, the absorption of ethylene decreases. There is then added, while stirring, 200 cc. hexane in order to dilute the reaction mixture and make it more easily stirrable, whereupon methyl alcohol is added. The reaction mixture at first still remains dark. Only upon suction filtering in contact with air does it change into a light olive green. This color is furthermore at first characteristic of the filtered precipitate. If the precipitate, after washing with methyl alcohol, is heated very slightly with about 5% nitric acid, it becomes pure white. It is then again filtered, washed with methyl alcohol and dried. There are obtained 40 grams of a pure white very loose powder which after pressing into sheets shows all the properties described for the product obtained in accordance with Example 2. The activity of the catalyst can be improved and more polyethylene obtained per gram of catalyst if the entire quantity of catalyst is not introduced at the beginning but the catalyst is rather added gradually drop by drop over a lengthy period of time. The same test can also be carried out with cooling of the reaction mixture to 10° C., particularly if a more readily mobile solvent such as hexane is used instead of liquid paraffin. The reaction time is then of course increased.

*Example 5*

Example 4 is repeated but the solution of the catalyst in the liquid paraffin is warmed to about 40–50° C. and then the gas mixture is passed through it. The said gas mixture contains about 10–20% ethylene as obtained by the thermal cracking of ethane. The course of the reaction is substantially the same as Example 4 but it takes about 10–12 hours before the same quantity of polymer is formed.

*Example 6*

Six liters of hexane, 82 grams aluminum triethyl and 24 grams titanium tetrachloride are stirred with ethylene of a maximum pressure of 5 atm. in the apparatus described in the preceding example. The initial temperature is 25° C. The temperature rises by itself to 35° C. After a total of 12 hours, the reaction is interrupted. There is then present in the autoclave a thick paste which is worked up in the manner described in detail in Example 5. There is obtained about 1 kg. of a colorless, high-grade polyethylene which can be used directly as molding powder.

*Example 7*

One gram of solid zirconium acetylacetonate is carefully added to 40 cc. aluminum triethyl. The zirconium salt passes into solution with a yellow color and the color then changes after it has been standing for about 10 minutes via brown to black. 200 cc. of hexane is added to this mixture whereupon it is introduced, under nitrogen, in a 500 cc. autoclave of ordinary steel. A total of 110 grams ethylene is then introduced under pressure in about 4 portions. The addition of the ethylene is so regulated that the initial pressure after the heating to about 100° C. is 90–100 atm. The autoclave is then shaken at 100° C. Two to three hours after the introduction of ethylene in each case there is noticed a rapid decrease in the pressure down to 10–20 atm. After the introduction under pressure of a total of 110 grams ethylene, the ethylene absorption proceeds only slowly evidently due to the fact that the contents of the autoclave have solidified at this time into a mixture of solid polyethylene and hexane which is no longer mobile and therefore can no longer be brought actively enough into contact with the ethylene by shaking. By using an autoclave which is provided with a strong agitator, this difficulty can be avoided and the absorption of the ethylene continued further. Small quantities (5 grams) of non-polymerized ethylene are thereupon drawn off and the autoclave opened. The content consists of a solid, snow-white mass dispersed with liquid which is stirred with methyl alcohol, suction filtered, heated with methyl-alcoholic hydrochloric acid in order to remove the metal compounds and then washed with methyl alcohol. No substantial quantities of soluble paraffin are extracted from the mass with boiling acetone. After drying at about 100°, the polyethylene represents a snow-white, finely granular powdered mass which upon pressing between metal plates heated to 150° C. followed by rapid cooling is converted into a clear and sometimes opaque film. This film is extremely elastic and can be torn only with the application of a very great force. The yield is practically quantitative.

*Example 8*

In a 14 liter autoclave provided with an agitator, there are mixed, under nitrogen, 6 liters of benzene, 88 grams aluminum triethyl and 10 grams zirconium acetylacetonate. Thereupon heating is effected to 50° C. and ethylene is introduced up to a pressure of about 5 atm. The pressure is maintained at this level and stirring effected for 10 hours. The mixture is then allowed to cool; the unreacted ethylene is blown off and the autoclave opened. A colorless polymer has precipitated in an extremely peculiar form on the agitator as well as on the bottom of the autoclave. The polymer consists of a mass of slightly swollen filaments which somewhat resemble long-fibered asbestos. The mass can be very easily removed from the agitator, washed with benzene and dried.

*Example 9*

Twenty cc. of aluminum triethyl are mixed with 20 cc. hexane and 2 grams thorium acetylactonate are introduced into this mixture. The acetylacetonate passes into solution and the mixture assumes a light yellow color, and spontaneously heats up to near the boiling point of the hexane. At the same time gas is generated. The mixture is introduced, under nitrogen, into a 500 cc. autoclave and 180 cc. of boiled, air-free hexane are added. Thereupon 105 grams ethylene are introduced under pressure and the autoclave heated to 95° C. The pressure rised temporarily to about 150 atm. but starts to decrease again before the autoclave has reached the temperature of 95° C. The autoclave is shaken for 40 hours at 95° C. and allowed to cool, whereupon any excess pressure which is still present is released. Three grams of gaseous constituents escape consisting principally of ethane which is normally admixed with the ethylene. The contents of the autoclave consists of a readily stirrable paste of a snow-white fibrous polyethylene suspended in hexane. The metal organic compounds are decomposed by the addition of methyl alcohol and suction filtered and the solid polyethylene is heated with methyl-alcoholic hydrochloric acid in order to eliminate the metal compounds. After the filtering, washing with methyl alcohol, and drying there are obtained 102 grams of the polyethylene. The polymer becomes soft at 145–150° C. and can be pressed between heated metal plates into clear sheets having extremely good mechanical properties.

*Example 10*

Example 9 is repeated but two grams of uranium tetrachloride are used instead of the thorium compound. A polyethylene which was excellent properties is produced.

*Example 11*

As in Example 7, 20 cc. aluminum triethyl are mixed with 0.2 gram vanadin-III-acetyl-acetonate. This mixture is also black. The mixture is subjected to further treatment as described in Example 1, and produces 6 grams butene and 15 grams polyethylene with a high melting point, as well as about 35 grams liquid and semi-solid soluble products.

*Example 12*

2 grams chromium acetyl-acetonate are added to 20 cc. aluminum triethyl with exclusion of air. Under heat the solution turns black, but there is no appreciable precipitation. The mixture is then diluted with 200 cc. hexane in a 500 cc. autoclave, whereupon a pressure of 70 atmospheres is produced with ethylene and the autoclave is shaken. The pressure drops rapidly to about 25 atmospheres because the solvent first absorbs the ethylene to saturation. More ethylene is added and the mixture shaken. The pressure now drops somewhat more slowly. This operation is repeated several times at increasingly long intervals. In the course of 24 hours 110 grams ethylene were introduced into the autoclave. The pressure at the end of the 24 hours was still 40 atmospheres.

The temperature rose precipitately to 30° C. at the beginning of the experiment. After 24 hours 41 grams of unchanged ethylene was blown off, whereupon the autoclave was opened and the contents were immediately mixed with methyl alcohol. The contents of the autoclave now form a semisolid mass which is washed out, sucked off and subsequently heated with methyl-alcoholic hydrochloric acid in order to remove the catalyst components, and again filtered. After drying, 69 grams of a colorless powder insoluble in all organic solvents was obtained which oculd easily be pressed into sheets between heated metal plates.

*Example 13*

2.5 grams of tungsten hexachloride, $WCl_6$, are added to 20 cc. aluminum triethyl and the mixture ground in 200 cc. hexane in a ball mill for two hours. The catalyst suspension is then introduced into a 500 cc. autoclave. Thereupon ethylene with a pressure of 160 atmospheres is allowed to act on the mixture at 100° C. for 24 hours. When the autoclave is opened about 10 grams of polyethylene products will be found.

*Example 14*

Add to 20 cc. aluminum triethyl 0.2 gram molybdenum acetyl-acetonate. Then proceed as in Example 13 and after 24 hours at 100° C. and 85 atmospheres ethylene pressure about 5 grams polyethylene of the type described will be obtained.

*Example 15*

To 20 cc. aluminum triethyl add 0.2 gram tantalum pentachloride, $TaCl_5$, and treat the mixture in the manner described in connection with Examples 13 and 14. At 90° C. and 90 atmospheres ethylene pressure 6 to 8 grams polyethylene are obtained after 20 hours.

*Example 16*

Add 4 grams zirconium tetrabromide to 20 cc. aluminum triethyl, grind the mixture for three hours in 200 cc. hexane in a ball mill and introduce the suspension into a 500 cc. autoclave. At 60° to 70° C. and 70 atmospheres ethylene pressure, 122 grams polyethylene are obtained after 24 hours.

*Example 17*

Introduce a mixture of 25 cc. aluminum triethyl and 0.5 gram $K_2TiF_6$ into 200 cc. hexane in a ball mill. Grind for three hours. Bring the mixture into a 500 cc. autoclave as indicated in Example 16. After 10 hours reaction at 100° C. and 60 to 70 atmospheres ethylene pressure 45 grams of polyethylene are obtained.

*Example 18*

Titanium hydrated oxide produced by careful hydrolysis of 5 grams titanium tetrachloride at 0° to −10° C., after being filtered and washed with ice water three times with 100 cc. aceton, once with 100 cc. ether and three times with petroleum ether, is poured off at 0° C. and completely dried after being subjected to suction for one hour. 0.4 grams of titanium compound thus treated are suspended in 100 cc. hexane and mixed with 20 cc. aluminum triethyl introduced drop by drop at 0° C. under nitrogen. The suspension is then introduced into a ball mill under nitrogen and ground for three hours. The suspension is then filled into a 500 cc. autoclave under nitrogen. Under the conditions indicated in Example 17, 35 grams of polyethylene are obtained.

*Example 19*

The zirconium, precipitated as hydrated oxide from an aqueous solution of zirconium nitrate by adding ammonia drop by drop at 0° C., is filtered, washed and dried as described in Example 18. 3 grams of zirconium hydrated oxide dried in the manner above indicated are added to 50 cc. aluminum trioctyl and this mixture is ground in 200 cc. hexane in a ball mill for two to three hours. Under the conditions indicated in Example 18, 55 grams polyethylene are obtained with the aid of a catalyst.

*Example 20*

250 moles aluminum triisobutyl are dissolved in 250 cc. diesel oil and 25 moles zirconium tetrabutylate added. Stirring intensively, the mixture is heated for five hours at 100° C. The catalyst mixture is diluted with 1500 cc. diesel oil and ethylene introduced at 55° C. for 6 hours. 10 grams polyethylene are formed.

*Example 21*

50 cc. of a 0.5 molecular solution of aluminum triisobutyl in diesel oil are dissolved in 100 cc. diesel oil and 50 cc. of a 0.5 molecular solution of titanium tetrachloride in diesel oil added drop by drop. The mixture is then stirred for ten minutes at room temperatures, diluted with 2.3 liters of diesel oil and ethylene introduced at 60° C. After one hour polymerisation at 60° to 70° C., 230 grams of polyethylene are obtained.

We claim:
1. Polymerization catalyst, comprising the product formed by mixing an effective amount of an aluminum trialkyl with a compound of a metal selected from the group consisting of salts, freshly precipitated oxides and hydroxides of metals of Groups IV–B, V–B and VI–B of the Periodic System, including thorium and uranium.
2. Catalyst according to claim 1, containing an excess of said aluminum trialkyl.
3. Catalyst according to claim 1, formed by mixing $2n$–$3n$ mols of said aluminum trialkyl with each mol of said metal compound, $n$ representing the valence of said group member.
4. Catalyst according to claim 1, in which said metal compound is an acetyl acetonate.
5. Catalyst according to claim 4, formed by mixing 2 mols of said aluminum trialkyl per mol of said metal compound.
6. Catalyst according to claim 1, in which said metal compound is a chloride.
7. Catalyst according to claim 1, in which said metal compound is an oxychloride.
8. Catalyst according to claim 1, in which said metal compound is titanium tetrachloride.
9. Catalyst according to claim 1, in which said metal compound is zirconium acetyl acetonate.
10. Catalyst according to claim 1, in which said metal compound is thorium acetyl acetonate.
11. Catalyst according to claim 1, in which said metal compound is uranium tetrachloride.
12. Catalyst according to claim 1 in which said aluminum trialkyl is aluminum triethyl.
13. Catalyst according to claim 12 in which said metal compound is a chloride.
14. Catalyst according to claim 13 in which said chloride is a titanium chloride.

References Cited by the Examiner

UNITED STATES PATENTS

| | | | |
|---|---|---|---|
| 2,396,920 | 3/1946 | Larson | 260—94.9 |
| 2,439,765 | 4/1948 | Walker | 252—431 |
| 2,567,109 | 9/1951 | Howard | 260—80 |
| 2,600,654 | 6/1952 | Jacobson | 260—441 |
| 2,691,647 | 10/1954 | Field et al. | 260—94.9 |
| 2,699,457 | 1/1955 | Ziegler | 260—94.9 |
| 2,721,189 | 10/1955 | Anderson | 260—94.9 |

FOREIGN PATENTS

| | | |
|---|---|---|
| 502,597 | 5/1954 | Canada. |
| 510,145 | 2/1955 | Canada. |
| 533,362 | 5/1955 | Belgium. |
| 874,215 | 4/1953 | Germany. |

(Other references on following page)

OTHER REFERENCES

Hall et al.: J. Inst. Petrol. Tech. 1937, vol. 23, pp. 679–687, (pp. 686–687 only needed).

Alexander "Colloid Chemistry," vol. VI, pp. 976, 977, Reinhold (1946).

JOSEPH L. SCHOFER, *Primary Examiner.*

W. BENGEL, MILTON STERMAN, MORRIS LIEBMAN, ALLEN M. BOETTCHER, BEN E. LANHAM, WILLIAM H. SHORT, *Examiners.*

N. H. BURSTEIN, E. ROBERTS, W. J. VAN BALEN, F. L. DENSON, *Assistant Examiners.*